UNITED STATES PATENT OFFICE.

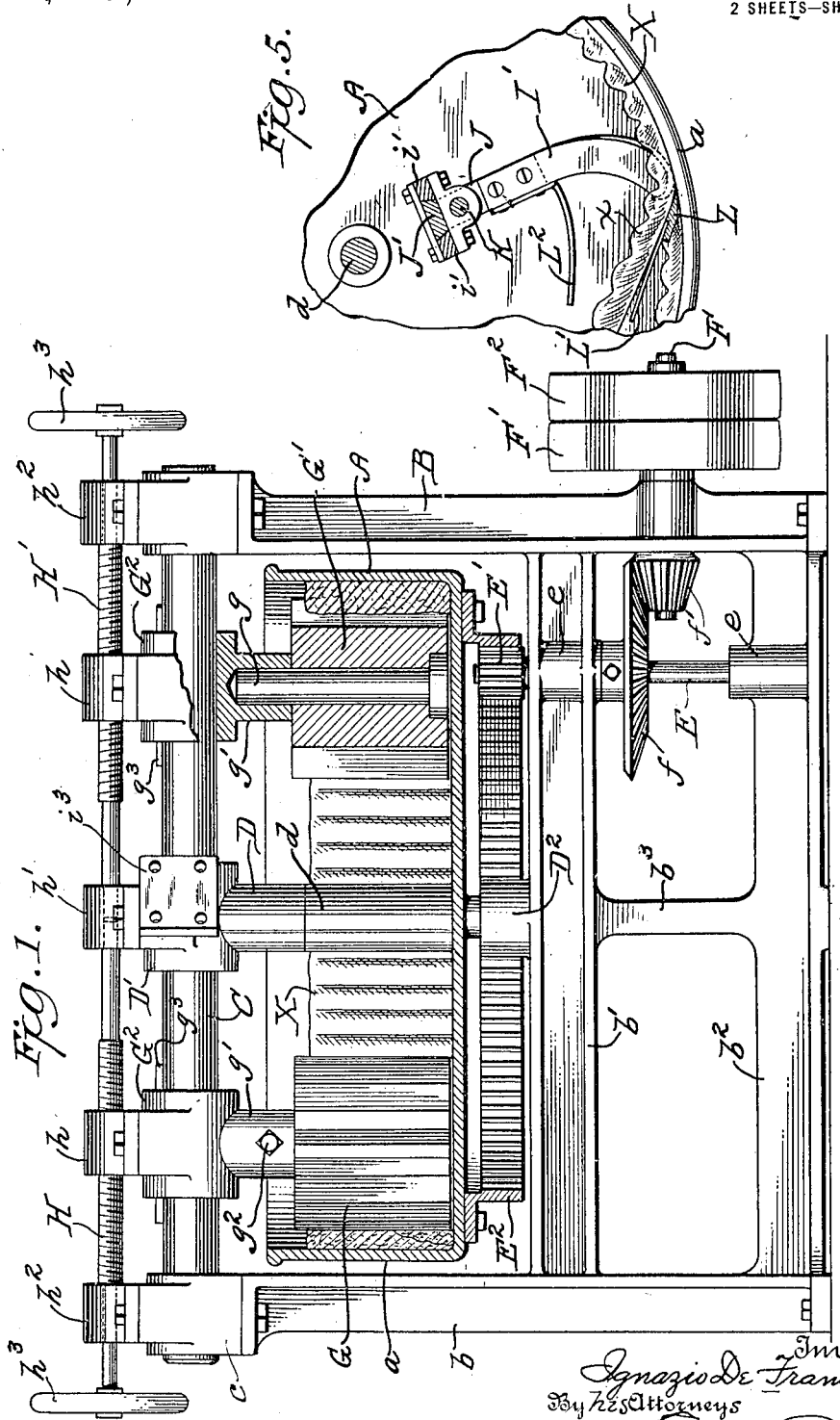

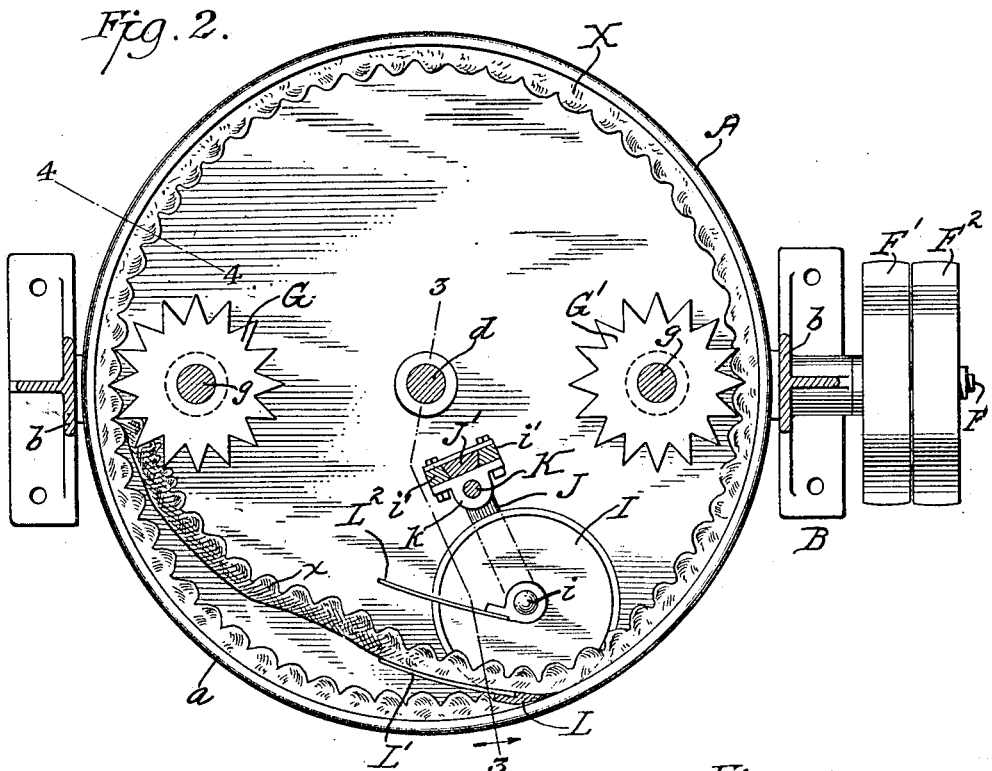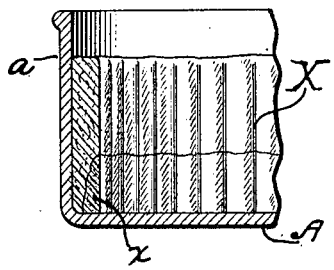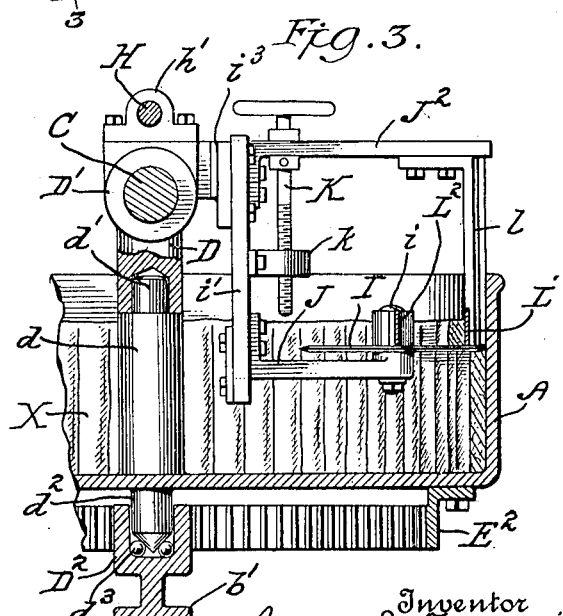

IGNAZIO DE FRANCISCI, OF NEW YORK, N. Y.

DOUGH-KNEADING MACHINE.

1,207,143.  Specification of Letters Patent.  Patented Dec. 5, 1916.

Application filed May 7, 1915. Serial No. 26,461.

*To all whom it may concern:*

Be it known that I, IGNAZIO DE FRANCISCI, a subject of the King of Italy, residing at the city of New York, borough of Brooklyn, county of Kings, and State of New York, have invented a certain new and useful Dough-Kneading Machine, of which the following is a specification.

This invention is a machine for kneading dough, the same being adapted, more particularly, for working the alimentary paste material employed in the production of macaroni, although it will be understood that the machine may be used for kneading other materials of a plastic or semi-plastic nature.

In the art of kneading the relatively stiff resisting dough used for macaroni it is usual to work the mass in a rotatory vessel by deflecting one part of the mass away from a surface of the vessel, so as to deposit the deflected part upon the bottom of said vessel, and to subject said deflected part of the mass to the action of horizontally positioned or inclined kneading rolls. This method is objectionable for several reasons, chief among which is that the material is subject to such friction in the deflecting and kneading operations as to result in undue heating of the material, thereby causing deterioration in such material, and, furthermore, the prior machines are so heavy and cumbersome as to require for their operation the expenditure of undue power.

According to my invention a portion of the mass is cut or sliced off and is fed continuously to the bottom part of the mass so that it is worked by a kneading roll or rolls back into the mass of material, the sliced material being reworked from the bottom to the top part of the mass lying against the inner surface of the rotatory vessel. The cutting mechanism may be either a rotatable knife or a stationary blade, and the position of said cutter relative to the wall of the vessel is varied by the operation of suitable means whereby the width of the material to be severed from the mass may be changed as desired.

Other features and advantages of the invention will appear from the following detailed description.

In the drawings, Figure 1 is a vertical section, partly in elevation, of a dough-kneading machine embodying my invention. Fig. 2 is a horizontal sectional plan view, the plane of the section being above the rotatory vessel. Fig. 3 is a vertical detail section taken in the plane indicated by the irregular line 3—3 of Fig. 2, illustrating more clearly the cutting mechanism and the means for adjusting the cutting element relatively to the wall of the rotatory vessel. Fig. 4 is a detail vertical section illustrating the method of working the sliced material into the mass of material lying against the wall of the vessel. Fig. 5 is a detail plan view, partly in horizontal section, illustrating a stationary knife for slicing off some of the material from the mass which lies against the wall of the rotatory vessel.

The rotatory vessel A for containing the material X to be kneaded is mounted in any suitable way for rotative movement in a horizontal plane and within a suitable framework B. As shown, said framework consists of side frames $b$ and a cross-beam $b'$, the latter being positioned intermediate the ends of the side frames. The side frames are joined at the bottom by a tie-bar $b^2$ connected by a web $b^3$ with the beam $b'$. The side frames are provided at their upper ends with bearings $c$ for the reception of an arbor C, the latter extending horizontally across the vessel A and at a suitable distance above said vessel.

The vessel is closed at the bottom and provided with a wall $a$ perpendicular to said bottom, the upper part of the vessel being open. Extending upwardly from the closed bottom of the vessel is a spindle $d$, the upper part of which terminates in a trunnion $d'$ which is mounted in a vertically positioned sleeve or bearing D, the latter depending from a horizontal sleeve D' mounted on the horizontal arbor C, see Figs. 1 and 3. Depending from the bottom of the rotary vessel A is a pintle $d^2$ which is supported in a step bearing $D^2$ secured to or made integral with the cross-beam $b'$ of the framework; if desired, the pintle $d^2$ may be supported by or rest upon ball bearings $d^3$, as shown in Fig. 3. The vessel A is thus mounted within the framework for rotation freely therein, rotary motion being given to the vessel from shaft E mounted in bearings $e$ and provided at the upper end with a spur gear E' which meshes directly with an internal gear $E^2$ attached to and depending from the bottom of the rotary vessel. Said shaft E is shown as having a bevel gear $f$ which meshes with a bevel pinion $f'$ on a horizontal shaft F the latter being provided with fast and loose pulleys F′ F², whereby the shaft F is adapted to be rotated by a belt so as to impart motion to the shaft E and to the vessel A.

G G′ indicate kneading rolls positioned vertically within the rotary vessel and adjacent to the perpendicular wall $a$ thereof, said kneading rolls being arranged on opposite sides of the central arbor $d$ of said vessel. Preferably, each kneading roll is provided with longitudinal ribs so that the working surface of each roll is substantially star-shaped, but the particular form of the roll is not essential. Said rolls are loosely mounted on vertical spindles $g$, the upper ends of which spindles enter vertical sleeves $g'$ within which the spindles are rigidly held by binding screws $g^2$. The vertical sleeves $g'$ are integral with and depend from horizontal sleeves $G^2$ mounted loosely on the horizontal arbor C, said sleeves $G^2$ being held from rotation on the arbor by keys $g^3$ which enter suitable keyways (not shown) in the horizontal sleeves $G^2$. The sleeves $G^2$, the arbor C and the spindles $g$ coöperate in supporting or suspending the kneading rolls G G′ in operative positions with respect to the inner surface of the wall $a$ forming a part of the rotatory vessel A, but the distance between the wall of the vessel and the surface of the kneading rolls may be varied according to the thickness of the mass or layer of material in contact with the inner surface of the vessel, for which purpose means are provided for shifting the sleeves $G^2$ to different operative positions along the horizontal arbor C. As shown more particularly in Fig. 1, the sleeves $G^2$ are provided with nuts $h$, the axial openings of which are threaded so that the screw spindles H H′ will have threaded engagement with the nuts. Said spindles are shown in Fig. 1 as being positioned in axial alinement, the inner ends of the spindles being loosely mounted in a bearing $h'$ extending upwardly from the central sleeve D′. The screw spindles are supported in other bearings $h^2$ secured to the upper ends of the side frames $b$, the outer ends of said spindles H H′ being provided with hand wheels $h^3$ or other devices whereby the spindles may be rotated when desired for the purpose of shifting the kneading rolls G G′ with respect to the wall of the vessel. It may be observed that the spindles H H′ are separate or independent so that either spindle may be operated for the purpose of adjusting one roll or the other in a direction toward or from the wall of the vessel, but such adjustment of the kneading roll or rolls does not in any way interfere with the free rotation of the roll or rolls on the spindle or spindles $g$.

A salient feature of my invention consists in the employment of cutting means positioned in such relation to the boundary wall of the rotatable vessel as to sever a slice of predetermined width from the material in contact with said wall, said cutting means being adjustable in a vertical direction and with respect to said wall of the vessel so as to cut slices of material varying in width from the mass. As shown more particularly in Figs. 2 and 3, the cutting device is a rotatable disk I the periphery of which is beveled to produce a cutting edge. The disk occupies a horizontal position so as to present the cutting edge thereof substantially into contact with the inner surface of the wall $a$, said disk being provided with a hub which is mounted to turn freely on a vertical arbor $i$. This arbor is carried by a horizontal arm J one end of which is bolted firmly to a slide J′. The centrally positioned sleeve D is provided with a face plate $i^3$, to which is firmly bolted parallel plates $i''$ which are vertically positioned adjacent to the sleeve D and arbor $d$, see Figs. 2 and 3. The plates $i'$ are relatively spaced to form a guideway adapted to receive the slide J′ which carries the arm on which the rotating cutter I is mounted, whereby said cutter is supported in an operative position within the rotatory vessel. The cutter may be raised or lowered by the operation of a spindle K, the latter having threaded engagement with a nut $k$ which is fixed to the parallel guide plates $i'$. This adjusting spindle has a swiveled connection with an arm $J^2$ attached rigidly at one end to the upper part of the slide J′, said slide J′ carrying at its lower end the arm J, and at its upper end the arm $J^2$, whereby the rotation of the spindle K in the nut $k$ raises or lowers the spindle and with it the arm $J^2$, slide J′, arm J and the rotary cutter I. It is thus apparent that the spindle K operates to raise or lower the cutter I with respect to the wall of the vessel, thus making provision for cutting off material the slice of which may vary in width.

L designates a scraper which is positioned above rotative cutter I and is supported for contact with the boundary wall $a$ of the rotatable vessel, whereby the scraper is adapted to deflect a slice which is severed from the mass of material by the operation of the cutter, the slice of material so deflected being indicated at $x$ in Fig. 2. The scraper L is supported in a fixed position by a post $l$ which is rigidly attached to the upper horizontal arm $J^2$. The post $l$ carries a guide L′ extending inwardly of the vessel, said guide L′ coöperating with the scraper L to direct the cut strip $x$ away from contact with the material lying against the wall of the vessel. The strip $x$ is adapted to pass loosely between the guide L′ and another guide $L^2$, the latter being attached to a part of the lower horizontal arm J. The cutter I and the scraper L are positioned to act upon the layer of material near the upper edge thereof, and when the cutter slices off a length x from the material said slice x drops upon the bottom of the rotatory vessel, so that the slice will be carried by the rotative movement of the vessel into the path of the kneading roll G. This roll acts upon the slice x in a manner to press or work said slice x into the layer of material lying in contact with the wall, whereby the material of the slice x will be worked by the successive action of the kneading rolls G G' from the bottom upward into the material composing the layer in contact with the wall of the vessel, as clearly indicated in Figs. 2 and 4.

It is not desired to limit the invention to the employment of a rotating cutter I for slicing a definite width of material from the mass within the vessel, for the reason that a stationary knife or cutter may be employed, as illustrated in Fig. 5. Said stationary knife or cutter may be employed as illustrated in Fig. 5. Said stationary knife or cutter I' is attached rigidly to the horizontal arm J, the latter being carried by the slide J' within the guideway formed by the parallel plates i'', said slide being adjusted by the screw K, all as hereinbefore described. The stationary cutter I' is supported in a position for contact with the wall of the vessel, and coöperating with this cutter is the scraper L adapted to cut a slice of material which is directed between the guides L', L².

The operation of the machine will be apparent from the description taken in connection with the drawings, but it may be summarized as follows: The mass of material is deposited within the vessel and the belt is slipped around the fast pulley for the purpose of driving the rotatory vessel at the required speed. The kneading rolls coöperate with the wall of the vessel in reducing the mass of material to a layer the thickness of which is determined by the distance separating the kneading rolls from the vessel's wall. The material X is pressed or forced against the wall by the action of the kneading rolls thereon, so that the material extends from the bottom of the vessel upwardly to a suitable point below the open upper end of said vessel. As the vessel and the material rotate, the cutter severs a slice of material from the upper edge portion, which slice of material is deflected by the scraper L and the guide L' away from the layer next to the wall of the vessel, as a result of which the slice x drops upon the bottom of the vessel and is carried by the rotative movement of the vessel into the path of the roll G. This roll acts upon the slice x to work or incorporate it into the material X from the bottom upward, and thus the material is continuously subjected to the action of the kneading rolls and the slice of material is worked back into the mass. When the material shall have been kneaded to a sufficient extent it is removed from the rotatory vessel and carried to the forming machine by which the material is pressed or drawn to produce macaroni in the manner well known to those skilled in the art.

Having thus fully described the invention, what I claim as new and desire to secure by Letters Patent is:—

1. In a kneading machine, the combination with a frame, and a rotatory vessel, of a supporting member carried by the frame and positioned diametrically across the vessel, vertically positioned kneading rolls, means for mounting said rolls in parallel relation to an upstanding wall of the vessel, and means carried by the supporting member for adjusting the position of said rolls to vary the kneading space between the rolls and the upstanding wall of the vessel.

2. In a kneading machine, the combination with a rotatory vessel having a vertically positioned wall, of idle kneading rolls, a support for slidably mounting said kneading rolls so as to vertically position the rolls within the vessel, and means for adjusting the kneading rolls diametrically across the vessel and thereby vary the kneading space between said rolls and the vertical wall of the vessel.

3. In a kneading machine, the combination with a rotatory vessel, of a kneading roll coöperating therewith, and cutting mechanism positioned for cutting a slice of definite width from a layer of material in contact with a vertical wall of said vessel.

4. In a kneading machine, the combination with a vessel and kneading mechanism one being rotatable with respect to the other for working the material so as to produce a layer in contact with a vertical wall of said vessel, and cutting mechanism positioned at an angle to the vertical of the vessel for severing a slice continuously from the layer of material which is distributed over said wall by the kneading mechanism.

5. In a kneading machine, the combination with a vessel and kneading mechanism one being rotatable with respect to the other for working the material so as to produce a layer in contact with the wall of said vessel, cutting mechanism positioned for severing a slice continuously from the layer of material, and means whereby the slice so severed is fed to the kneading mechanism so as to be incorporated by the action thereof into the material of the layer.

6. In a kneading machine, the combination with a rotatory vessel, and kneading mechanism positioned for working the material into a layer adapted to contact with a wall of said vessel, and cutting mechanism in coöperative relation to the wall of the vessel for severing from said layer a slice of definite width from the upper portion of the layer of material, which slice of material is removed from contact with the wall and incorporated by the action of the kneading mechanism into the material of said layer by working it from the bottom upwardly into the layer.

7. In a kneading machine, the combination with a rotatory vessel, of kneading mechanism positioned for working the material to be treated into a layer in contact with a vertical wall of said vessel, and means effective by the rotation of the vessel for transversely severing a slice of material from said layer and from the vertical wall, which slice of material is fed by the rotative movement of the vessel to the kneading mechanism so as to be reincorporated by the action of the kneading mechanism into the layer of material.

8. In a kneading machine, the combination with a vessel and kneading mechanism rotative relatively one to the other for working the material into a layer having contact with a wall of said vessel, of means for removing from said layer and the wall a slice of material of predetermined width which is adapted by the action of the kneading mechanism to be reincorporated into the material of the layer.

9. In a kneading machine, the combination with a rotatory vessel and kneading mechanism coöperating therewith, of cutting mechanism positioned for severing a slice of material from the layer in contact with a wall of said vessel, a scraper for removing the slice of material from contact with the wall of the vessel, and means for directing the slice of material to said kneading mechanism.

10. In a kneading machine, the combination with a rotatory vessel and kneading mechanism coöperating therewith, of cutting mechanism positioned for severing a slice of material from the layer which is in contact with a wall of said vessel intermediate the height of said layer, and means for shifting said cutting mechanism axially relative to the wall of said vessel for cutting slices the width of which varies according to the position of the cutting mechanism.

11. In a kneading machine, the combination with a rotatory vessel and kneading mechanism coöperating therewith, of a rotatable cutter positioned in coöperative relation to a wall of said vessel, said cutter being rotatable by the rotative movement of the vessel.

12. In a kneading machine, the combination with a rotatory vessel and kneading mechanism coöperating therewith, of a cutter carrier, means for raising or lowering it within said vessel, a cutter mounted on said carrier so as to be presented thereby transversely to the material in contact with a vertical wall of the vessel for cutting the material circumferentially, a scraper to contact with the vertical wall of the vessel for removing the material from the wall severed by the cutting mechanism, and a guiding element mounted on the carrier for directing the strip of severed material.

13. In a kneading machine, the combination with a rotatory vessel and kneading mechanism coöperating therewith to engage a layer of material in contact with the wall of the vessel, of a rotatable cutter positioned in coöperative relation to the wall of the vessel to sever a slice from the layer of material, and means for adjusting the cutter relatively to the height of the wall of the vessel.

14. In a kneading machine, the combination with a rotatory vessel and kneading mechanism coöperating therewith to engage a layer of material in contact with the wall of the vessel, of a rotatable cutter operable circumferentially of the vessel to sever a slice from the layer of material, means to support said cutter, and a guide carried by the cutter-supporting means to direct the severed slice of material to the kneading mechanism.

In testimony whereof I have subscribed my name to this specification.

IGNAZIO DE FRANCISCI.